T. TAIT.
WATER-WHEEL.
No. 171,191.  Patented Dec. 14, 1875.
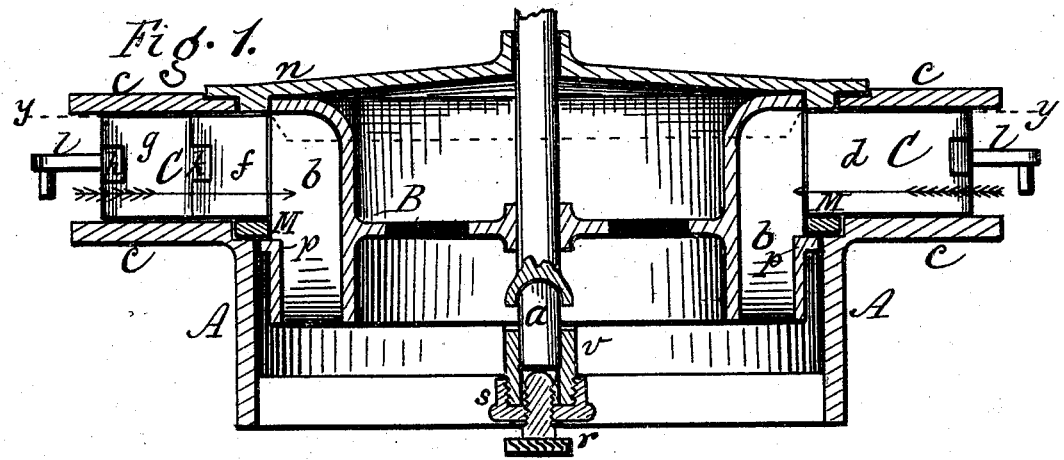
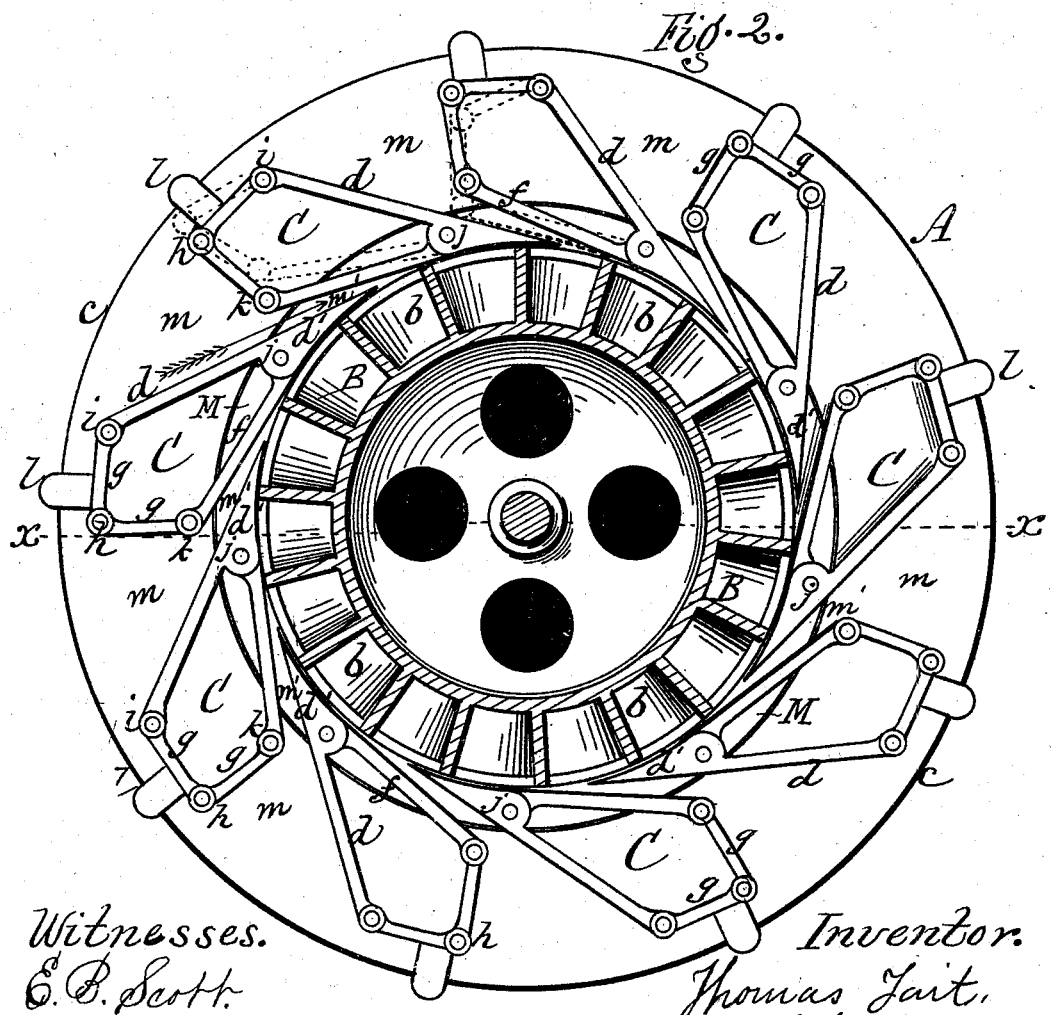
Witnesses.  
E. B. Scott  
Jacob Spinler
Inventor.  
Thomas Tait,  
per R. F. Osgood,  
Atty.

UNITED STATES PATENT OFFICE.

THOMAS TAIT, OF ROCHESTER, NEW YORK.

IMPROVEMENT IN WATER-WHEELS.

Specification forming part of Letters Patent No. 171,191, dated December 14, 1875; application filed October 18, 1875.

*To all whom it may concern:*

Be it known that I, THOMAS TAIT, of the city of Rochester, in the county of Monroe and State of New York, have invented a certain new and useful Improvement in Water-Wheels; and I do hereby declare that the following is a full, clear, and exact description of the construction and operation of the same, reference being had to the accompanying drawings, in which—

Figure 1 is a central vertical section in line $x$ $x$, Fig. 2. Fig. 2 is a horizontal section in line $y$ $y$, Fig. 1.

My improvement relates to turbine-wheels.

The invention consists, essentially, in the construction and arrangement of the devices for letting on and cutting off the flow of water to the wheel, and of a packing-ring and projecting flange for preventing the escape of waste-water around the wheel.

A is the curb, and B the wheel. The latter is centered upon a step, $a$, to run true in the curbing, and is provided with ordinary vertical buckets $b$ $b$, as shown. C C are the guides or cut-offs for controlling the admission of water to the wheel. They are located between the upper and lower flanges C C of the curb, on a line with the buckets, and are constructed and operated as follows: $d$ is a plate, forming the stationary side of the guide or cut-off. It stands at a tangent to the wheel, so as to direct the water upon the outer portion and bodily against the bucket, instead of toward the center, as in most of the turbines of this class. Next to the wheel it has a butment, $d'$, made concentric and close fitting thereto, but enlarged or thickened at the rear end to form a bearing for the swinging plate. $f$ is a swinging plate, pivoted at $j$ to the rear of the butment, and $g$ $g$ are two angle-plates, pivoted together at $h$, and, respectively, to the outer end of the plates $d$ $f$ at $i$ and $k$. The plates fill the vertical space between the flanges of the curbing, and, since the plates $f$ $g$ $g$ are swinging plates, turning from the fixed centers $j$ and $i$, it will be seen that the trapezium or lozenge thus formed can be expanded or contracted by pushing in or drawing out at the outer end, as indicated by the dotted lines at the top and left in Fig. 2. To the outer end of each of these guides or cut-offs is attached a crank-arm, $l$, with which connects a ring and connecting-rods, or other devices for operating them.

Thus arranged the water-ways leading from the outside to the wheel are made wide and angular at the outer end, as shown at $m$, and narrower and wedge-shaped at the inner end, as shown at $m'$, the latter also striking the bucket on the outer edge, and bodily, so as to expend the greatest force thereon, instead of striking more toward the center, as in most other wheels. The passages $m'$ $m'$ always remain of this wedge form, however expanded or contracted, varying only in degree; and, therefore, the water is led up to the very point of impact, under its greatest pressure, and there it expends its force in the most effective manner. Even when nearly closed, the wedge shape of the inner water-passage will deliver the water in a compressed form upon the outer edge of the bucket, thereby producing great power with but a small expenditure of water, and the friction of the water in reaching the wheel is very materially reduced. In shutting off the water the wedge contracts gradually till the plates $d$ $f$ lie together, as shown by dotted lines at the right in Fig. 2, and in admitting water again the angular outer passage $m$ concentrates it near to the wheel, so that but slight motion is necessary to bring it in operation.

It will be noticed that the expansion and contraction of the guides or cut-offs comes on one side only—viz, on the side of the swinging plate $f$—the plate $d$ being always stationary, and preserving the same angle relatively with the wheel; hence there will be no material difference in the angle at which the water impinges on the buckets at different openings of the guides or cut-offs, but it will always strike bodily and on the outer edge of the bucket, nearly at right angles thereto.

In addition to the above, the angular form of the guides or cut-offs is such as to easily divide the water at the outer end, directing it into the passage $m$ on opposite sides, where it concentrates, by the narrowing of the inner end of the guides or cut-offs, into the interior passages $m$. By this means the pressure of the water is not only made more effective on the wheel, but the guides or cut-offs themselves can be easily opened against the pressure of the water, which could not be so easily done if the ends of the guides or cut-offs were square, or approximately so.

The angle of the plates $g\ g$ may be made more or less acute or obtuse to balance, or nearly balance, under different degrees of hydrostatic pressure, by which means they will retain their position when opened without materially drawing upon the power which opens them. The greater the head of water the less angular must be the plates, and the less the head the more angular must be plates. In constructing the wheel the angle can be adjusted to the head of water used.

As many of these guides or cut-offs are employed as can be made to work easily and effectively in the curbing, and the greater the number that are used, the greater will be the number of streams impinging upon the buckets, and the more effective will be the result. The guides or cut-offs thus arranged can be readily removed, so that if any one is broken or impaired it can be taken out and the wheel still be used till a more favorable opportunity arrives for permanent repairs, thereby preventing loss of time, which usually occurs in water-wheel when injured.

M is a metallic ring, which is inserted in a groove or seat cut in the inner edge of the lower flange $c$ of the curbing, at a point intermediate between the top and bottom of the wheel, and projects over a corresponding flange, $p$, projecting from the periphery of the wheel. This ring is bolted to its seat by screws or otherwise, and it forms a packing, covering the flange of the wheel and breaking the joint leading from the space below the wheel to the water-passage $m'$ above; therefore, this ring will cut off and prevent the escape of waste-water around the wheel, and direct the whole water to the buckets, whence it escapes downward in the ordinary way. When the wheel is adjusted up so that its top strikes the cover $n$, the flange $p$ of the wheel strikes up under the ring G, and makes a close surface joint. This packing-ring is essential, since the wheel running rapidly in the curbing wears at the periphery, and soon leaves a loose joint, however tightly it may have been fitted at first, unless some provision, as above described, is made for the tightening of the joint.

The step $a$ is made adjustable in its socket $v$ by means of a set-screw, $r$, which rests in a nut, $s$, or equivalent, that screws upon the socket $v$. Both the nut and the screw are adjustable, and the step can be raised or lowered to adjust the wheel to the packing ring as the step wears away. The step has a spline, to prevent its turning around, and in removing it, it is taken out at the bottom by removing the screw and nut.

The wheel above described is more effective than ordinary water-wheels of its class, and a greater percentage of power is obtained from a given quantity of water, owing to the gradual concentration of the water to the wheel, and its discharge in wedge shape upon the outer edge of the buckets.

It will be noticed that when the water is entirely cut off, the cut-off is close to the periphery of the wheel, and that in opening again a very slight movement is sufficient to admit the water; whereas, in ordinary wheels, the gates, when closed, cut off the water at some distance back from the periphery of the wheel, thereby requiring more motion of the water to strike the wheel, rendering them less effective in operation.

Having thus described my invention, I do not claim, broadly, a swinging plate for expanding and contracting the water-passage to the wheel; neither do I claim a packing under the wheel, and between it and a flange of the case, to prevent the escape of water; but

I claim—

1. The trapezium or lozenge shaped guides or cut-offs C, constructed with the fixed plates $d$, swinging plates $f$, and jointed angle-plates $g\ g$, whereby the water-ways $m'$ are of regular wedge shape under all degrees of opening, the narrow end of the wedges resting against the periphery of the wheel, the whole arranged as described, so that the water, under varying heads, or under different degrees of opening, will be discharged directly in contact with the buckets, and nearly at right angles thereto, as shown and described.

2. The flange $p$, projecting from the periphery of the wheel B, at a point between the top and bottom of the wheel, in combination with the ring M, set into the edge of the curbing on a line with the floor of the water-way, and projecting over the flange, as shown and described, and for the purpose specified.

In witness whereof I have hereunto signed my name in the presence of two subscribing witnesses.

THOMAS TAIT.

Witnesses:
R. F. OSGOOD,
E. B. SCOTT.